(12) United States Patent
Tabinoki (10) Patent No.: US 10,830,285 B2
(45) Date of Patent: Nov. 10, 2020

(54) PRESSURE PLATE AND CLUTCH DEVICE

(71) Applicant: HONDA MOTOR CO., LTD., Tokyo (JP)

(72) Inventor: Yukihisa Tabinoki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 42 days.

(21) Appl. No.: 16/269,062

(22) Filed: Feb. 6, 2019

(65) Prior Publication Data

US 2019/0257369 A1 Aug. 22, 2019

(30) Foreign Application Priority Data

Feb. 19, 2018 (JP) ................................. 2018-027120

(51) Int. Cl.
| | | |
|---|---|---|
| *F16D 13/71* | (2006.01) | |
| *F16D 13/72* | (2006.01) | |
| *F16D 13/74* | (2006.01) | |
| *F16D 13/56* | (2006.01) | |

(52) U.S. Cl.
CPC ............ *F16D 13/71* (2013.01); *F16D 13/56* (2013.01); *F16D 13/72* (2013.01); *F16D 13/74* (2013.01); *F16D 2300/24* (2013.01); *F16D 2300/26* (2013.01)

(58) Field of Classification Search
CPC .......... F16D 13/72; F16D 13/71; F16D 13/74; F16D 13/56; F16D 2300/24; F16D 2300/0214; F16D 2300/06; F16D 25/123
See application file for complete search history.

(56) References Cited

U.S. PATENT DOCUMENTS

| | | | |
|---|---|---|---|
| 6,401,896 B1 * | 6/2002 | Schnepf .................. | F16D 13/74 192/113.34 |
| 8,997,962 B2 | 4/2015 | Yazaki et al. | |
| 2011/0192699 A1 * | 8/2011 | Yazaki .................... | F16D 13/74 192/70.12 |
| 2017/0089452 A1 * | 3/2017 | Deutsch .................. | F16D 13/76 |

FOREIGN PATENT DOCUMENTS

| | | | |
|---|---|---|---|
| DE | 102014212808 | * | 1/2016 |
| JP | 2011-163425 A | | 8/2011 |

OTHER PUBLICATIONS

Machine Language translation of DE102014212808.*

* cited by examiner

*Primary Examiner* — Mark A Manley
(74) *Attorney, Agent, or Firm* — Carrier Blackman & Associates, P.C.; Joseph P. Carrier; William D. Blackman (57) ABSTRACT

A pressure plate of a clutch device includes a clutch outer member for supporting friction discs, and a clutch center member for supporting clutch discs. The pressure plate has a deep hole portion for accommodating a clutch spring acting between the pressure plate and the clutch center member; and a through hole at a center thereof extending between an inside and an outside of the clutch device in a clutch axis direction. Oil is supplied from the outside into the through hole. The pressure plate has a radial passage extending in a radially outward direction from the through hole at an axially inner end portion of the through hole to make the inside and outside of the through hole communicate with each other. An annular rib is formed on a peripheral surface of an outer end portion of the through hole extending toward the center of the through hole.

10 Claims, 6 Drawing Sheets

PRESSURE PLATE AND CLUTCH DEVICE

TECHNICAL FIELD

The present invention relates to a pressure plate of a clutch device of a power unit, and a clutch device including the pressure plate.

BACKGROUND ART

In general, in a wet-type multi-plate clutch device of a power unit including an internal combustion engine, where lubrication and cooling are performed by scraping oil by rotation of a clutch outer member, there arises a state where a lower portion of the clutch outer member is immersed in oil stored in a lower portion of the power unit when the internal combustion engine is stopped.

In such a wet-type multi-plate clutch device, once the internal combustion engine is started and rotational speed is increased, lubricant oil is supplied by an oil pump to respective parts to be lubricated and respective parts to be cooled. Accordingly, oil level is lowered or oil is splashed to the outer periphery due to the centrifugal force generated by the rotation of the clutch outer member, and hence the supply of oil to the clutch device becomes insufficient. In view of this, a structure is adopted in which oil formed into an oil mist or into a splashed oil in the power unit case is caught by the inner surface of a clutch cover and is introduced into the clutch device.

For example, Patent Document 1 below discloses a structure where splashed oil adhering to the clutch cover is collected and is discharged into a hollow portion of a clutch pressing member.

However, in the structure disclosed in Patent Document 1, a protruding portion, as oil supply means, extending from the clutch cover passes through a through hole formed in a center portion of a pressure plate and is inserted into the hollow portion of the pressing member. Accordingly, an end of the hollow portion is formed as an open end and there occurs a case where oil is discharged from the open end and flows out from an outer end portion of the through hole.

PRIOR ART DOCUMENT

Patent Document

[Patent Document 1] JP 2011-163425 A (See FIG. 2)

SUMMARY OF INVENTION

Underlying Problem to be Solved by the Invention

The present invention has been made in view of the above-described prior art, and it is an object of the present invention to provide a pressure plate of a clutch device where oil supplied into a through hole formed in the pressure plate can be supplied into the interior space of a clutch device, and the oil is prevented from being discharged from an outer end portion of the through hole on an opposite side. It is also an object of the present invention to provide a clutch device including the pressure plate.

Means to Solve the Underlying Problem

To achieve the above-mentioned object, the present invention provides a pressure plate of a clutch device comprising: a clutch outer member for supporting a friction disc in a relatively rotatable manner and in a slidable manner in a direction of a clutch axis of the clutch device; and a clutch center member for supporting a clutch disc in a relatively non-rotatable manner and in a slidable manner in the direction of the clutch axis; in which the clutch device includes therein a pressure plate and a clutch spring for axially acting between the pressure plate and the clutch center member, the pressure plate having a deep hole portion for accommodating the clutch spring therein; wherein:

the pressure plate has a through hole in a center thereof, the through hole penetrating the pressure plate to extend between an inside and an outside of the clutch device in a direction of the clutch axis, the through hole being supplied with oil from outside of the clutch device into the through hole; the pressure plate has a radial passage extending in a radially outward direction from the through hole in an axially inner end portion of the through hole so as to make an inside of the through hole communicate with an outside of the through hole; and the through hole has an annular rib on an inner peripheral surface of an axially outer end portion of the through hole, the annular rib protruding toward a center of the through hole.

According to the pressure plate having the above-stated configuration, the radial passage is formed in the through hole of the pressure plate, and hence the inside of the through hole and the interior space of the clutch device, where the deep hole portion is positioned, communicate with each other, whereby oil supplied into the through hole can be supplied to the interior space of the clutch device through the radial passage by centrifugal force. Further, the periphery of the through hole where the radial passage is formed can be reinforced by the annular rib. Still further, the annular rib can prevent oil supplied to the inside of the through hole from being discharged from the axially outer end portion of the through hole on an opposite side to the inside of the clutch device.

In a preferred embodiment of the invention, the radial passage includes a radial groove provided in a radial direction in an end surface of an axially inner end portion of the through hole, and a washer in contact with the end surface.

With such a configuration, the radial passage which forms the oil passage can be formed by applying mechanical working to only the pressure plate without increasing the number of parts.

In a preferred embodiment of the invention, the pressure plate includes: a center part formed with the through hole and the annular rib; and an outer peripheral part formed around a center line of the pressure plate and having a fitting hole in which the center part is fitted, the deep hole portion being formed on the outer peripheral part; the center part has a circular cylindrical portion forming a circular cylindrical surface concentric with the through hole and is press-fitted in the fitting hole, and a notched portion formed by cutting the circular cylindrical surface; and the radial passage is formed of a radial hole making the through hole and the notched portion communicate with each other.

With such a configuration, the radial passage is formed by forming the radial hole in the center part, which is a small member, and hence the pressure plate can be easily formed by mechanical working. Further, a space having a large capacity can be formed by the notched portion between the fitting hole and the through hole at an exit of the radial passage in a centrifugal force direction. Accordingly, oil can be easily discharged from the through hole in a radially outward direction through the radial passage and hence oil supplied into the through hole can be easily supplied to the side of the deep hole portion. Further, the pressure plate is a split body formed of the center part and the outer peripheral part, and hence it is possible to increase the degree of freedom in setting the positions of the annular rib and the radial passage.

The present invention also provides a clutch device comprising the above-stated pressure plate, wherein an oil supply portion for supplying oil into the pressure plate is provided so as to be disposed at an axially inner end portion of the through hole, more axially inside of the annular rib in the through hole.

According to the clutch device having the above-stated configuration, with the provision of the annular rib, it is possible to prevent oil from being discharged from the axially outer end portion of the through hole, and oil can be easily supplied to the deep hole portion, the clutch disc and the friction disc.

In a preferred embodiment of the invention, a pressing member for pressing the pressure plate by way of a washer and a bearing is disposed on an axial end surface of the axially inner end portion of the through hole, and the pressing member has an axially outer end portion positioned on a more axially inner side of the through hole than the annular rib in a direction of the clutch axis, and the annular rib has an inner diameter smaller than an outer diameter of an outer end portion of the pressing member.

With such a configuration, by arranging the annular rib at the position where the annular rib does not interfere with the axially outer end portion of the pressing member in a clutch axis direction, a protruding amount of the annular rib toward the center of the through hole can be increased, and hence it is possible to effectively prevent oil from being discharged from the axially outer end portion of the through hole.

Advantageous Effects of Invention

According to the pressure plate of the present invention, the radial passage is formed in the through hole of the pressure plate, and hence the inside of the through hole and the interior space of the clutch device, where the deep hole portion is positioned, communicate with each other, whereby oil supplied into the through hole can be supplied to the interior space of the clutch device through the radial passage by a centrifugal force. Further, a periphery of the through hole where the radial passage is formed can be reinforced by the annular rib. Still further, the annular rib can prevent oil supplied to the inside of the through hole from being discharged from the axially outer end portion of the through hole on an opposite side to the interior space of the clutch device.

Further, according to the clutch device of the present invention, with the provision of the annular rib, it is possible to prevent oil from being discharged from the axially outer end portion of the through hole, and oil can be reliably supplied to the deep hole portion, the clutch disc and the friction disc.

MODES FOR CARRYING OUT THE INVENTION

A clutch device 1 and a pressure plate 20 of the clutch device 1 according to a first embodiment of the present invention will be described with reference to FIG. 1 to FIG. 5.

Figure 1:
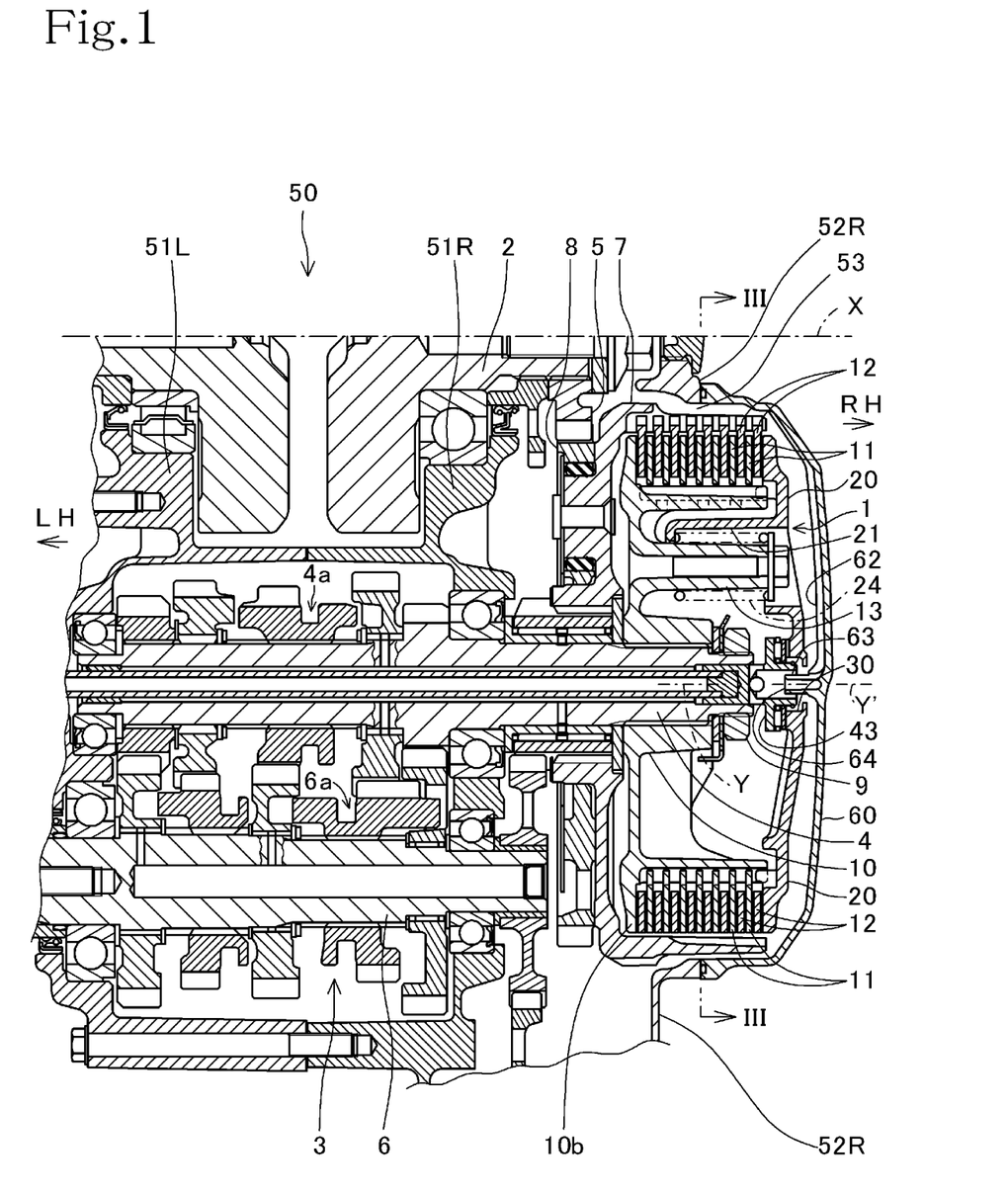
FIG. 1 is a sectional view of a clutch device according to a first embodiment of the present invention in which a part of a transmission and so on disposed adjacently to the clutch device is also shown.

As shown in FIG. 1, the clutch device 1 according to this embodiment is a wet-type multi-plate clutch device mounted on a power unit 50 having an internal combustion engine which is mounted on a motorcycle, a buggy or the like. However, in the present invention, a vehicle on which the clutch device 1 is mounted and an application of the power unit are not limited, and the application of the clutch device 1 in an installation-type power unit is not excluded. Further, the kind and number of cylinders and the like of the internal combustion engine which forms the power unit are not also limited.

In the drawings, arrows described as "LH", "RH", and "UP" respectively indicate a leftward direction, a rightward direction, and an upward direction as viewed in a vehicle advancing direction in the arrangement of the power unit 50 in a state where the power unit 50 is mounted on the vehicle. Small arrows applied on the respective devices and members schematically indicate flow directions of lubrication oil and cooling oil.

The above-described definitions are also applicable to a second embodiment to be described later.

FIG. 1 is a sectional view of the clutch device 1 in the power unit 50 where an axis X of a crankshaft 2 and an axis Y of a main shaft 4 are disposed parallel to each other and approximately horizontally when the power unit 50 is mounted on the vehicle including a part of a transmission 3 and the like disposed adjacent to the clutch device 1.

In this embodiment, the main shaft 4 is disposed to be directed in a vehicle width direction (a lateral direction in the figure). However, the present invention is also applicable to a vehicle where a main shaft is disposed in a vehicle advancing direction.

In the first embodiment shown in FIG. 1, the clutch device 1 is disposed in a rotational power transmission path ranging from the crankshaft 2, which is pivotally supported by left and right power unit cases 51L and 51R of the power unit 50 whose entire structure is not shown in FIG. 1, to the main shaft 4 of the transmission 3 disposed in the left and right power unit cases 51L and 51R. The main shaft 4 of the transmission 3 is configured to transmit rotational power of the crankshaft 2 from a primary drive gear 5 disposed on the crankshaft 2 by way of the clutch device 1.

The clutch device 1 is mounted on the main shaft 4 protruding rightward (rightward in FIG. 1) from the right crankcase 51R. The clutch device 1 is positioned in an opening portion 53 of a right crankcase cover 52R mounted on the right power unit case 51R. The opening portion 53 is closed by a clutch cover 60 which covers the outside of the clutch device 1.

The clutch device 1, in response to a gear change operation by a driver, does not transmit rotational power of the crankshaft 2 to the main shaft 4 of the transmission 3 during gear shifting of the transmission 3, and transmits the rotational power to the main shaft 4 when gear shifting is finished.

The transmission 3 includes the main shaft 4 and a counter shaft 6 disposed parallel to the crankshaft 2 and pivotally supported by the left and right power unit cases 51L and 51R. Both shafts 4 and 6 have gear trains 4a and 6a respectively, and are operated and connected to each other in response to gear shifting operation. The counter shaft 6 forms an output shaft of the power unit 50.

Hereinafter, the clutch device 1 according to the first embodiment will be described with reference to FIG. 2 which is an enlarged sectional view of a main part of the clutch device 1 according to the first embodiment.

The clutch device 1 includes a bottomed circular cylindrical clutch outer member 7 which is rotatably supported on the main shaft 4 of the transmission 3, and a primary driven gear 8 which meshes with the primary drive gear 5 fitted on the crankshaft 2. The primary driven gear 8 is mounted outside a bottom portion of the clutch outer member 7 (on the left side in FIG. 2). A primary speed reduction device is formed of the primary drive gear 5 having a relatively small diameter and the primary driven gear 8 having a larger diameter than the primary drive gear 5.

Accordingly, an axis of the clutch device 1 (clutch axis) is aligned with an axis Y of the main shaft 4.

In the clutch outer member 7 is disposed a bottomed circular cylindrical clutch center member 10 which is engaged with the main shaft 4 by spline fitting and is fixedly mounted on the main shaft 4 by a nut 9. A plurality of clutch discs 11 are supported on an outer peripheral side of a peripheral wall portion 10a of the clutch center member 10 in a relatively non-rotatable manner and in a slidable manner in the direction of the clutch axis Y.

On an inner peripheral side of a peripheral wall portion 7a of the clutch outer member 7, a plurality of friction discs 12 are supported in a relatively non-rotatable manner and in a slidable manner in the direction of the clutch axis Y. The friction disc 12 and the clutch disc 11 are made to alternately overlap with each other in the direction of the clutch axis Y.

The pressure plate 20 is disposed on the friction disc 12 positioned on an axially outermost side (right side in FIG. 2) among the clutch discs 11 and friction discs 12, in a state where the pressure plate 20 is in contact with the friction disc 12. The pressure plate 20 operates to sandwich the clutch discs 11 and the friction discs 12 in cooperation with a pressure receiving portion 10b of the clutch center member 10.

A plurality of protruding portions 13 (only one protruding portion 13 shown in FIG. 1 and FIG. 2) are formed, on an annular planar portion 10c of the clutch center member 10, so as to protrude toward the side of the pressure plate 20, and a threaded hole 13a is formed in the center of a distal end of the protruding portion 13.

On the other hand, a plurality of deep hole portions 21 (only one deep hole portion 21 shown in FIG. 1 and FIG. 2) are formed on the pressure plate 20 such that the deep hole portions 21 are recessed toward the side of the annular planar portion 10c of the clutch center member 10, and an insertion hole 23 is formed in a bottom portion 22 of the recessed deep hole portion 21.

The protruding portion 13 is made to pass through the insertion hole 23 formed in the deep hole portion 21 of the pressure plate 20, and protrudes into the deep hole portion 21. A clutch spring (coil spring) 24 is disposed in a contracted state between a washer 15 fixed by a bolt 14 threadedly mounted in the threaded hole 13a of the protruding portion 13 and a seat surface 22a formed on the bottom portion 22 of the recessed deep hole portion 21 of the pressure plate 20.

On the peripheral wall portion 10a of the clutch center member 10, a plurality of communication holes 16 are formed. The communication holes 16 make an inner peripheral side and an outer peripheral side of the peripheral wall portion 10a communicate with each other.

The pressure plate 20 is pressed inward (leftward in the figure) by the clutch springs 24, and hence the pressure plate 20 is constantly biased so as to press the clutch discs 11 and the friction discs 12 toward the pressure receiving portion 10b of the clutch center member 10, thus establishing a connection state of the clutch device 1.

Due to the pressing force of the pressure plate 20, the clutch discs 11 and the friction discs 12 frictionally engage with each other, and hence rotational power of the clutch outer member 7 is transmitted to the clutch center member 10, and the main shaft 4 is integrally rotated with the clutch center member 10 in response to the rotation of the clutch center member 10.

A hollow hole 40 is formed in the main shaft 4 coaxially with the axis Y, and a clutch operating shaft 41 is made to pass through the hollow hole 40. A cylinder-shaped enlarged hole portion 42 which opens at an end of the main shaft 4 is formed on an end portion of the hollow hole 40 on the side of the clutch device 1 (right side in FIG. 2). A pressing member 43 is inserted into the enlarged hole portion 42 in an axially slidable manner.

In the pressing member 43 inserted into the enlarged hole portion 42, a fitting hole 44 is formed, which opens to the clutch operating shaft 41 and is aligned with the axis Y in a state where the pressing member 43 is inserted. An end portion of the clutch operating shaft 41 on the side of the clutch device 1 (right side in FIG. 2) is inserted and fitted in the fitting hole 44. The other end (not shown) (left end as viewed in FIG. 2) of the clutch operation shaft 41 is connected to a clutch operating mechanism not shown in the drawings.

On an axially outer end portion 43a of the pressing member 43 on a side opposite to the fitting hole 44, an oil receiving hole 45 is formed and opens coaxially with the fitting hole 44. A bottom portion of the oil receiving hole 45 does not communicate with the fitting hole 44, and opens in a peripheral outer surface of the pressing member 43 through oil flow-out holes 45a formed perpendicular to an axis of the oil receiving hole 45.

A flange portion 46 is formed in a projecting manner on the outer surface of the pressing member 43 where the oil receiving hole 45 is formed such that the flange portion 46 surrounds the periphery of the outer surface of the pressing member 43 about the axis Y.

On the other hand, the pressure plate 20 has a through hole 30 which is formed in a center portion of the pressure plate 20. In a state where the pressure plate 20 is assembled to the clutch device 1, a center axis Y' of the through hole 30 is positioned substantially on the same line as the clutch axis Y, and the through hole 30 penetrates the pressure plate 20 in the direction of the center axis Y'.

In such a state, the outer end portion 43a of the pressing member 43 extending axially outward from the flange portion 46 is positioned in the through hole 30 formed in the pressure plate 20, and the flange portion 46 is brought into contact with an opening peripheral end surface 31 of the inner end portion 30a of the through hole 30 formed in the pressure plate 20, by way of a bearing 47 and a washer 48 mounted on the axially outer end portion 43a. A retainer ring 49 is mounted axially outside the washer 48 mounted on the outer end portion 43a.

The washer 48 is not limited to a usual annular circular disc member having a doughnut shape provided that the washer 48 is formed of a member which is mounted on the axially outer end portion 43a and has a flat surface portion brought into contact with the opening peripheral end surface 31 on a side opposite to the side of the bearing 47.

When the clutch operating shaft 41 is pushed outward in an axial direction (direction indicated by an arrow P, rightward in the direction of the axis Y in the drawings) by a clutch operating mechanism not shown, the clutch operating shaft 41 pushes the pressure plate 20 toward the outside of the clutch (rightward in the direction of the axis Y) by way of the pressing member 43, the bearing 47 and the washer 48.

When the pressure plate 20 moves toward the axially outside of the clutch against the biasing force of the clutch springs 24, the pressing force of the pressure plate 20 applied to the clutch discs 11 and the friction discs 12 is decreased, and hence friction engagement between the clutch discs 11 and the friction discs 12 is released. In this state, rotational power of the clutch outer member 7 is not transmitted to the clutch center member 10, and hence the clutch device 1 is brought into a disconnected state.

Next, when the pressing force toward the axially outside of the clutch by the clutch operating mechanism is released, the pressure plate 20 pushes back both the pressing member 43 and the clutch operating shaft 41 by the clutch springs 24, and moves toward the axially inside of the clutch (leftward in the direction of the axis Y). Accordingly, a pressing force of the pressure plate 20 applied to the clutch discs 11 and the friction discs 12 is restored, and hence the clutch device 1 returns to a connected state.

The clutch cover 60 covers an axially outer side of the clutch device 1 at the opening portion 53 of the right power unit case cover 52R. As shown also in FIG. 3 which is an inner surface view of the clutch cover 60 showing only the clutch cover 60 as viewed from a plane III-III in FIG. 1 and as viewed in the direction of the arrows, in a state where the clutch cover 60 is assembled, ribs 62 are formed on an inner surface 61 of the clutch cover 60, which ribs 62 extend from a center portion O, which overlaps with the clutch axis Y, to an upper side of the outer periphery the clutch cover 60.

Figure 3:
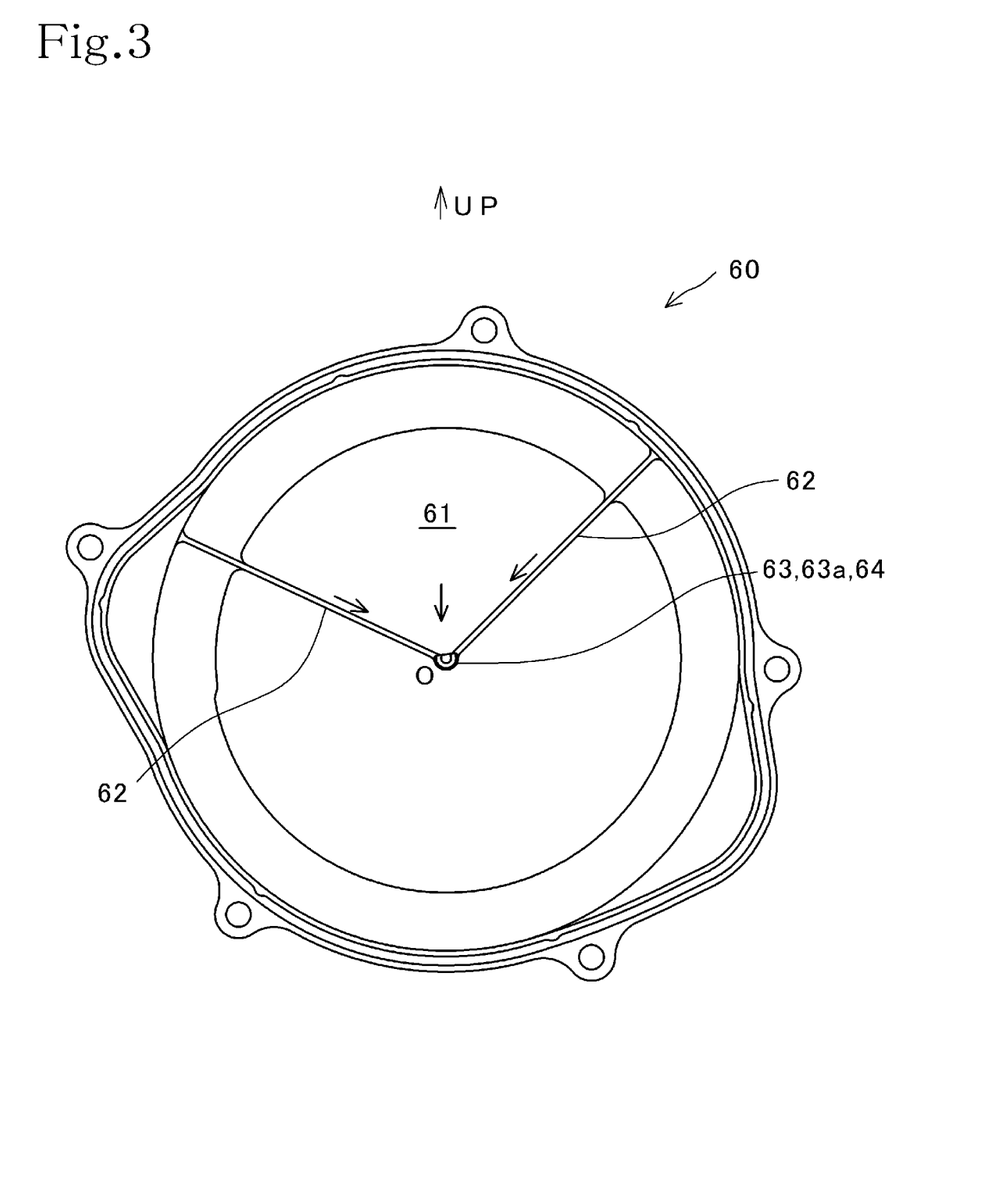
FIG. 3 is a view showing an inner surface of a clutch cover as viewed from a plane taken along a line III-III in FIG. 1 in an arrow direction.

A protruding gutter portion 63 which protrudes toward the pressure plate 20 is formed on lower ends of the ribs 62 at a center portion O of the clutch cover 60. The protruding gutter portion 63 is formed in a gutter shape which opens upward.

A distal end 63a of the protruding gutter portion 63 forms an oil supply portion 64 for the pressure plate 20, and is positioned in a protruding manner into the through hole 30 formed in the center portion of the pressure plate 20.

Accordingly, the distal end 63a of the protruding gutter portion 63 extends into an end portion opening of the oil receiving hole 45 formed in the axially outer end portion 43a of the pressing member 43 positioned in the through hole 30.

Hereinafter, the pressure plate 20 will be described with reference to FIG. 2 and FIG. 4, which is a longitudinal cross-sectional view of the pressure plate 20 by taking out only the pressure plate 20 shown in FIG. 2.

The deep hole portions 21, which accommodate the clutch springs 24 engaging with the clutch center member 10 as described previously, are formed inside the pressure plate 20 of the clutch device 1.

Figure 4:
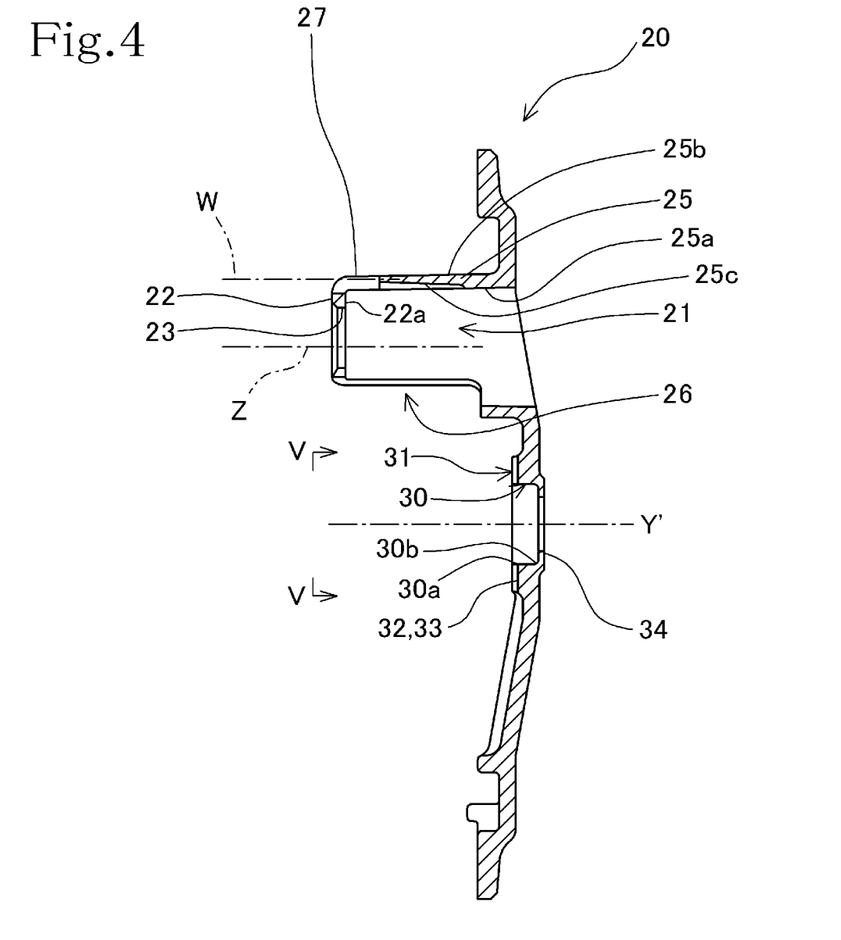
FIG. 4 is a vertical sectional view of a pressure plate showing only the pressure plate taken out from the configuration shown in FIG. 2.

In this embodiment, the deep hole portions 21 are formed at four portions of the pressure plate 20 over the entire circumference (one portion shown in FIG. 4). The axes Z of these deep hole portions 21 are arranged on the same circle around the center axis Y' when the pressure plate 20 is viewed in the direction of the center axis Y' of the pressure plate 20.

As shown in FIG. 4, the deep hole portion 21 is formed of: the bottom portion 22 which forms the seat surface 22a for receiving the clutch spring 24; and a wall portion 25 which has a portion thereof formed into a circular cylindrical shape having the circular cylindrical axis Z parallel to the clutch axis Y and having an inner surface side 25a thereof directed toward the side of the clutch axis Y. The wall portion 25 has a notched portion 26 formed by opening a portion of the wall portion 25, opposite to the inner surface side 25a with respect to the axis Z.

The deep hole portion 21 accommodates the clutch spring 24 on the inner surface side 25a of the wall portion 25, and has a communication portion 27 in the form of a cutout, which makes the inner surface side 25a and an outer surface side 25b of the wall portion 25 communicate with each other.

The communication portion 27 is formed to extend toward the wall portion 25 from the bottom portion 22 in a direction of a center line W parallel to the axis Z of the deep hole portion 21. Accordingly, the communication portion 27 can be formed together with the deep hole portion 21 and so on by casting, at the time of manufacturing the pressure plate 20.

A center axis Y' of the pressure plate 20 is substantially aligned with the axis of the main shaft 4, that is, with the clutch axis Y in an assembled state except for an amount of tolerance, clearance in assembling and the like.

The through hole 30 which penetrates between the inside and outside of the clutch device 1 along the direction of the clutch axis Y is formed on the center portion of the pressure plate 20, and the opening peripheral end surface 31 on the side of the inner end portion of the through hole 30 is brought into contact with the flange portion 46 of the pressing member 43 by way of the washer 48 and the bearing 47 as described previously.

According to the clutch device 1 of this embodiment having the above-mentioned configuration, at the time of starting the internal combustion engine of the power unit 50, the clutch outer 7 operates to scrape lubricant oil. On the other hand, as the rotational speed of the internal combustion engine is increased, the supply of oil to the clutch device 1 is mainly performed by capturing oil in a mist form or splashed form by the inner surface 61 of the clutch cover 60 and by guiding oil particularly to the clutch discs 11 and the friction discs 12.

Figure 2:
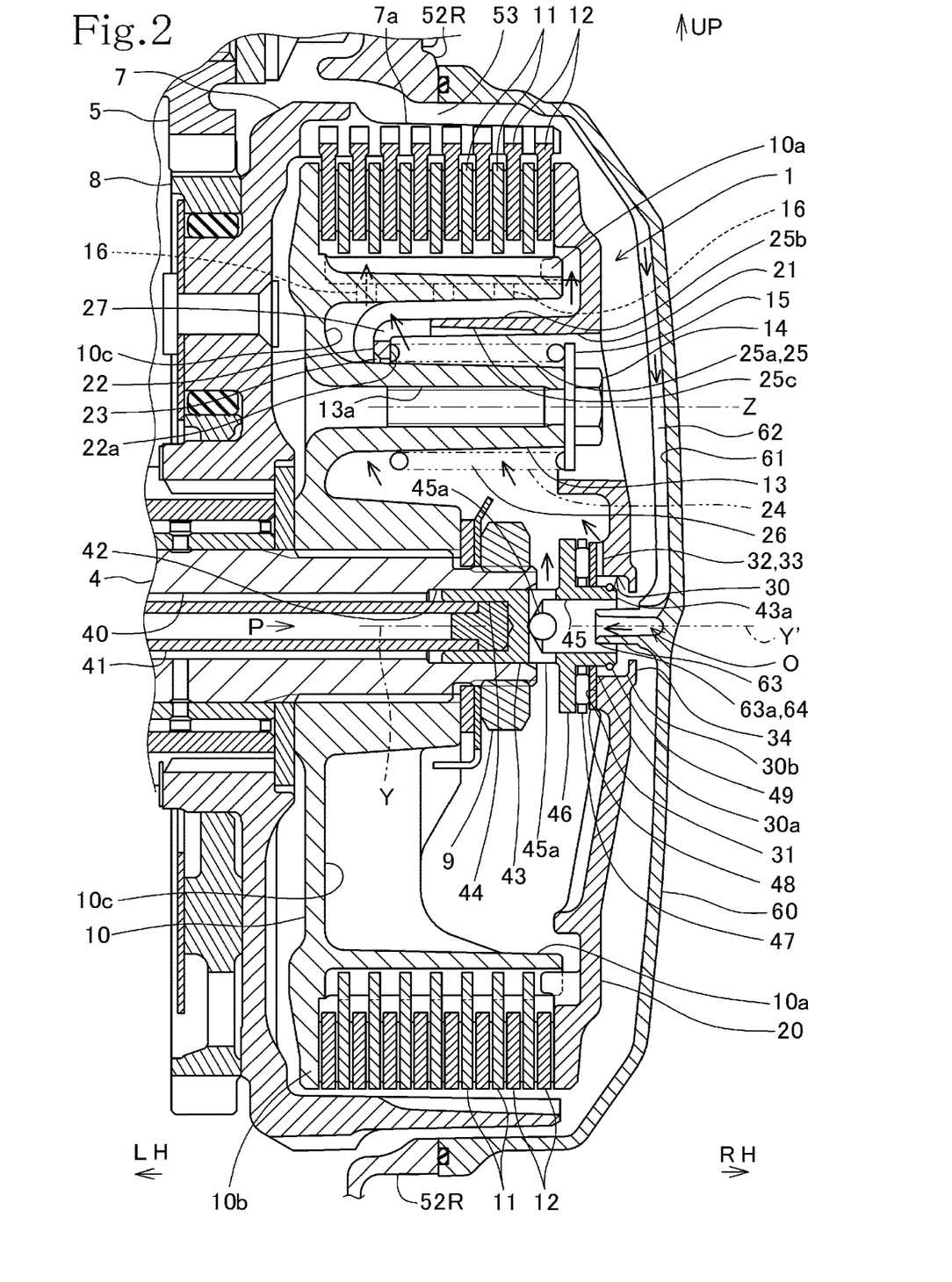
FIG. 2 is an enlarged sectional view of a main part of the clutch device according to the first embodiment.

To explain the clutch device 1 of the first embodiment with reference to FIG. 2 and FIG. 3, oil formed in a mist form or a splashed form is captured by the inner surface 61 of the clutch cover 60, is guided by the ribs 62 extending from the clutch axis Y to the upper side of the outer periphery, is collected by the protruding gutter portion 63 formed on the lower end of the ribs 62, and flows into the through hole 30 formed in the center portion of the pressure plate 20 positioned in such a manner that the distal end 63a of the protruding gutter portion 63 which forms the oil supply portion 64 to the pressure plate 20.

That is, the pressure plate 20 has the through hole 30 into which oil is supplied from the outside of the clutch device 1 at the center of the pressure plate 20.

Oil supplied into the through hole 30 is supplied into the oil receiving hole 45 of the pressing member 43 inserted into the through hole 30. Then, due to a centrifugal force generated by the pressing member 43 which rotates together with the clutch center member 10 and the pressure plate 20, oil flows out in a radial direction from the oil flow-out hole 45a into a space formed between the pressure plate 20 and the clutch center member 10 on the side of the deep hole portion 21.

The wall portion 25 of the deep hole portion 21 has the notched portion 26 formed by cutting off a portion of the wall portion 25 along the clutch axis Y. Accordingly, a part of oil which flows out from the oil flow-out hole 45a in radial directions flows through the notched portion 26 into the deep hole portion 21, and the other part of oil routes around the deep wall portion 21 and reaches the inner peripheral of the peripheral wall portion 10a of the clutch center member 10.

The plurality of communication holes 16, which make the inner peripheral side and the outer peripheral side of the peripheral wall portion 10a communicate with each other, are formed in the peripheral wall portion 10a. Accordingly, due to a centrifugal force generated by the rotating peripheral wall portion 10a, oil reaches the clutch discs 11 and the friction discs 12 through the communication holes 16. Alternatively, oil reaches the clutch discs 11 and the friction discs 12 from an axial edge portion of the peripheral wall portion 10a.

On the other hand, with respect to oil which flows into the deep hole portion 21, a portion of the wall portion 25 of the deep hole portion 21 is formed in a circular cylindrical shape having the axis Z parallel to the clutch axis Y and has the inner surface side 25a of the portion directed toward the clutch axis Y. On the other hand, as shown in FIG. 2 and FIG. 4, in this embodiment, the deep hole portion 21 has the communication portion 27 which makes the inner surface side 25a and the outer surface side 25b of the wall portion 25 communicate with each other. Accordingly, oil flowing into the deep hole portion 21 does not stay on the inner surface side 25a of the wall portion 25 and is easily discharged through the communication portion 27 to the outer surface side 25b by centrifugal force generated due to the rotation of the pressure plate 20.

Discharged oil reaches the clutch discs 11 and the friction discs 12 through the communication hole 16 formed in the peripheral wall portion 10a of the clutch center member 10 or via the edge portion of the peripheral wall portion 10a, and is used for lubrication and cooling of these parts.

As a result, lubrication property and cooling property of the friction discs 12 and the clutch discs 11 around the deep hole portion 21 are enhanced, and hence a disc sliding lifetime is increased, circulation property of oil is enhanced and hence oil can be effectively used.

However, the oil supply portion 64 extending from the side of the clutch cover 60 protrudes into the through hole 30 formed in the pressure plate 20, and the of supply portion 64 is positioned in the oil receiving hole 45 of the pressing member 43, and hence the oil receiving hole 45 forms an open end. Accordingly, there is a concern that a part of oil supplied into the through hole 30 is discharged from the open end, and flows out from the outer end portion 30b of the through hole 30 due to a centrifugal force generated by the rotating pressure plate 20.

In view of the above, in this embodiment, the pressure plate 20 has the configuration which suppresses the flow out of oil supplied into the through hole 30 from the outer end portion 30b of the through hole 30 and further promotes the supply of oil to the internal space of the clutch device 1.

Figure 5:
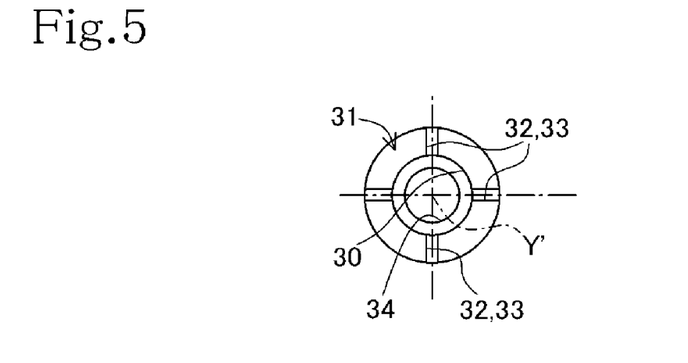
FIG. 5 is an inner side view of a center portion of the pressure plate as viewed from a plane taken along a line IV-IV in FIG. 4 in an arrow direction.

That is, as slow shown in FIG. 5, which is an inner side view of the center portion of the pressure plate 20 as viewed from a plane taken along a line V-V in FIG. 4 in an arrow direction, there is provided in this embodiment a plurality of radial grooves 32 are formed in radial directions in the opening peripheral end surface 31 of the inner end portion 30a of the through hole 30 of the pressure plate 20, and radial oil passages 33 are formed between the opening peripheral end surface 31 and the washer 48, which is brought into contact, by way of the bearing 47, with the opening peripheral end surface 31 by the pressing member 43.

As a result, the radial passages 33, which are the oil passages extending in radial directions from the through hole 30, are formed on the side of the inner end portion 30a of the through hole 30, and hence the inside and the outside of the through hole 30 communicate with each other, so that the inside of the through hole 30 and the internal space or inside of the clutch device 1, where the deep hole portion 21 is positioned, communicate with each other. Accordingly, oil supplied to the through hole 30 can be supplied to the inside of the clutch device 1 through the radial passages 33 due to a centrifugal force, and hence lubrication property and cooling property of the friction discs 12 and the clutch discs 11 are further enhanced.

The radial grooves 32 and the radial passages 33 are not limited to the grooves and the passages which are formed in a straight line shape extending in a radial direction as shown in FIG. 4 and FIG. 5. The radial grooves 32 and the radial passages 33 may respectively have a bent portion or may respectively have inclination with respect to a radial direction.

In addition to the above-described configuration, an annular rib 34 is formed in a protruding manner on an inner peripheral surface of the outer end portion 30b of the through hole 30 toward the center of the through hole 30, that is, toward the center of the pressure plate 20. With the provision of the annular rib 34, it is possible to prevent oil supplied to the through hole 30 from being discharged from the outer end portion 30b of the through hole 30 on a side opposite to the inside of the clutch device 1.

The annular rib 34 may not have a uniform height with respect to the inner peripheral surface of the through hole 30, and may not be formed such that the annular rib 34 is formed over the entire circumference. This configuration is also applicable to the second embodiment.

Further, the provision of the annular rib 34 ensures improved reinforcement of the periphery of the through hole 30 where the plurality of radial grooves 32 are provided to form the radial passages 33.

The radial passages 33 are formed by merely forming the radial grooves 32 in the opening peripheral end surface 31 of the through hole 30 of the pressure plate 20. Accordingly, by only applying mechanical working to the pressure plate 20, the radial passages 33 which form the oil passages can be formed without increasing the number of parts.

As shown in FIG. 2, the oil supply portion 64 for supplying oil to the pressure plate 20 is disposed on the side of the inner end portion 30a of the through hole 30, at a position more axially inside than the annular rib 34 in the through hole 30. Therefore, due to the provision of the annular rib 34, it is possible to prevent oil from being discharged from the outer end portion 30b of the through hole 30, and oil can be easily supplied to the deep hole portion 21, the clutch discs 11, the friction discs 12 and so on.

The pressing member 43 which presses the pressure plate 20 by way of the washer 48 and the bearing 47 is disposed on the opening peripheral end surface 31 of the inner end portion 30a of the through hole 30, the outer end portion 43a of the pressing member 43 is positioned on the side of the inner end portion 30a of the through hole 30, at a more axially inner position than the annular rib 34 in the direction of the clutch axis Y, and the annular rib 34 is set to have an inner diameter smaller than an outer peripheral diameter of the outer end portion 43a of the pressing member 43.

Accordingly, by arranging the annular rib 34 at the position where the annular rib 34 does not interfere with the outer end portion 43a of the pressing member 43 in the direction of the clutch axis Y, a protruding amount of the annular rib 34 toward the center of the through hole 30 can be increased, and hence it is possible to more effectively prevent oil from being discharged from the outer end portion 30b of the through hole 30.

Further, as shown in FIG. 4, notched grooves 25c are formed in the inner surface side 25a of the wall portion 25 of the deep hole portion 21 in the direction of the axis Z, and hence oil reserved in the deep hole portion 21 is increased whereby a smooth lubrication flow of oil is realized. The notched groove 25c may be formed such that the notched groove 25c has a depth gradually increasing toward the side of the communication portion 27 as shown, or may be formed parallel to the inner surface side 25a of the wall portion 25 so as to have a uniform depth. Still further, a uniform notched surface may be formed on the inner surface side 25a of the wall portion 25 in a circumferential direction to circumferentially connecting the notched grooves 25c. Such configurations are also applicable to the second embodiment.

A clutch device 101 and a pressure plate 120 of the clutch device 101 according to a second embodiment of the present invention will be described with reference to FIG. 6 to FIG. 8.

The configurations of the pressure plate 120 and the clutch device 101 of the second embodiment are substantially equal to the configurations of the pressure plate 20 and the clutch device 1 of the first embodiment except that the second embodiment differs from the first embodiment with respect to the configuration of the pressure plate 120. Accordingly, the description of constitutional parts of the second embodiment having substantially the same functions and arrangements as those of the first embodiment is omitted by giving the same symbols as the first embodiment. Symbols in the order of 100 having the same lower two digits are given to the constitutional parts having substantially the same configurations as the first embodiment but having different functions or different arrangements compared to the first embodiment, and suitable symbols of order of 100 are given to the constitutional parts unique to the second embodiment. The points which make the second embodiment different from the first embodiment will be mainly described.

FIG. 1 is referenced also by the second embodiment except that the pressure plate 120 differs from the pressure plate 20 of the first embodiment.

FIG. 3 is referenced also by the second embodiment.

Figure 6:
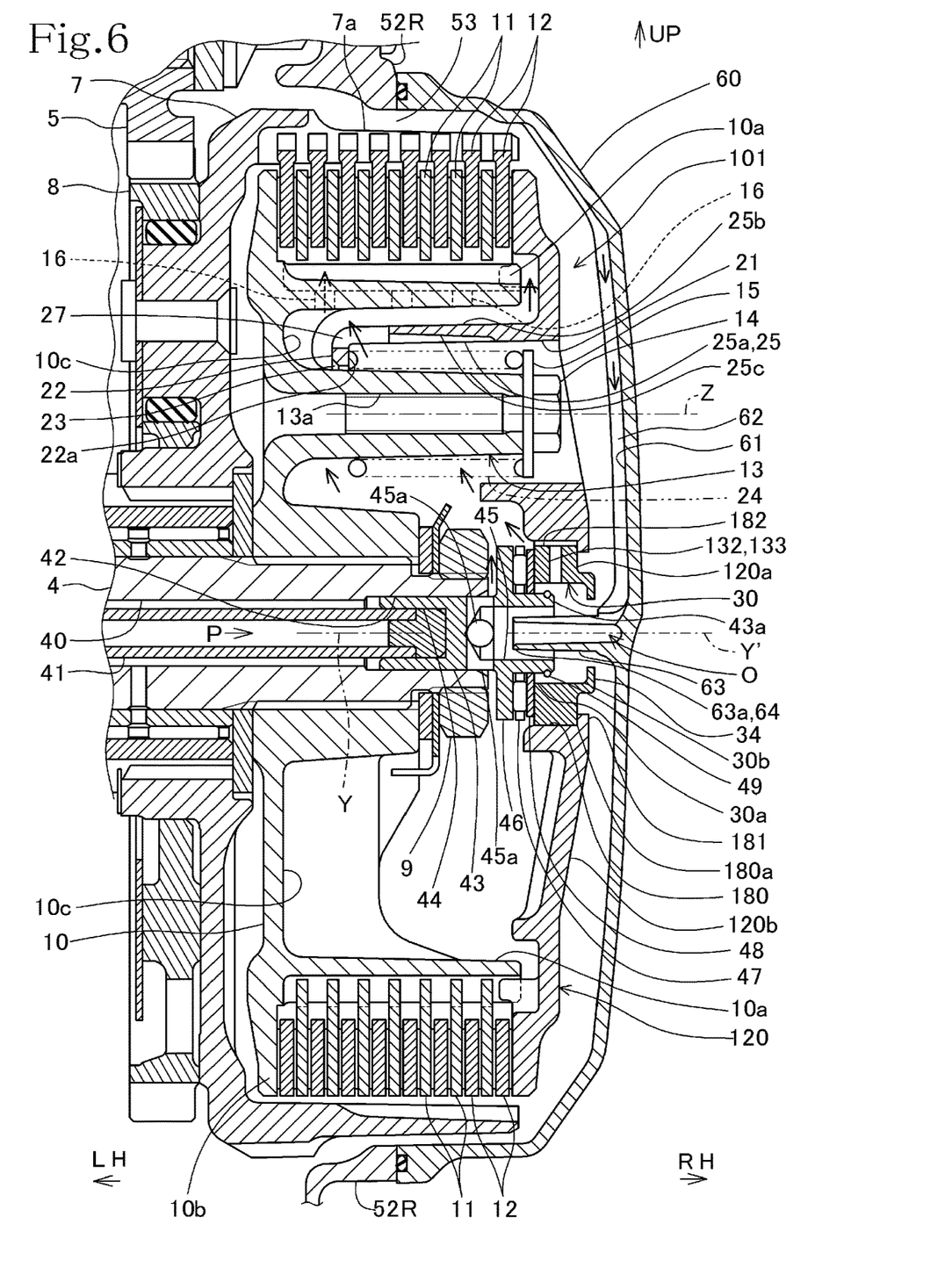
FIG. 6 is an enlarged sectional view of a main part of a clutch device according to a second embodiment of the invention.

FIG. 6 is an enlarged sectional view, similar to FIG. 2, of a main part of the clutch device 101 of the second embodiment.

Figure 7:
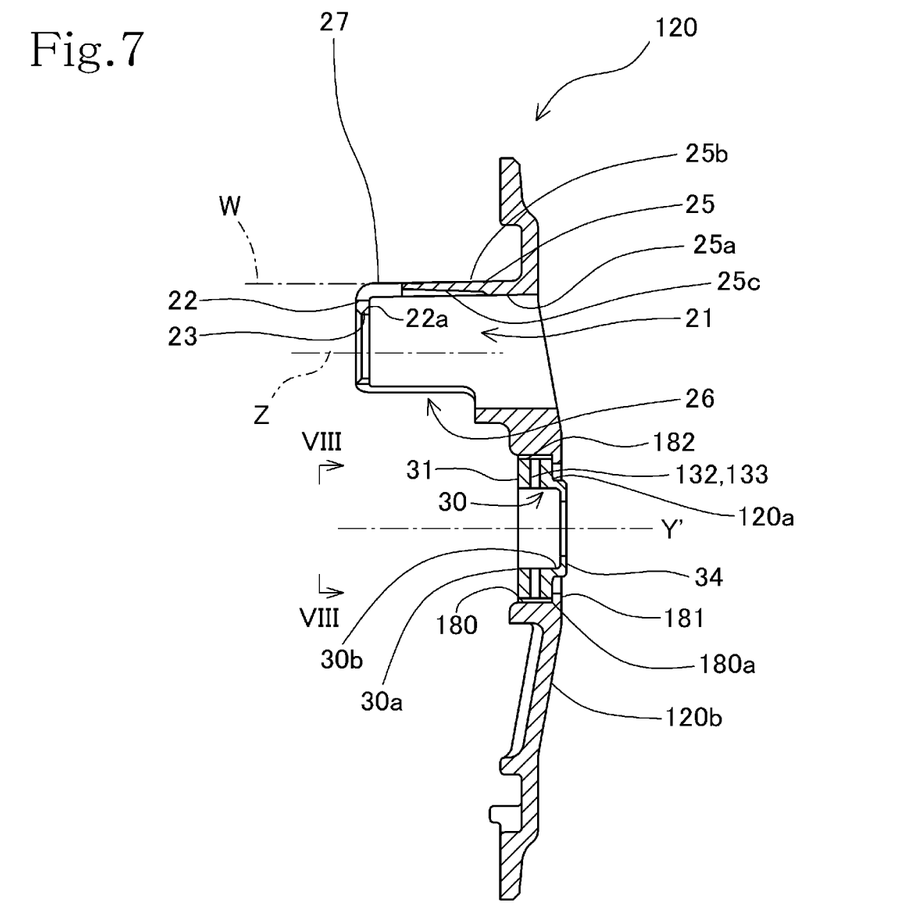
FIG. 7 is a vertical sectional view of a pressure plate showing only the pressure plate taken out from the configuration shown in FIG. 6.

FIG. 7 is a longitudinal sectional view of the pressure plate 120 by taking out only the pressure plate 120 shown in FIG. 6.

Figure 8:
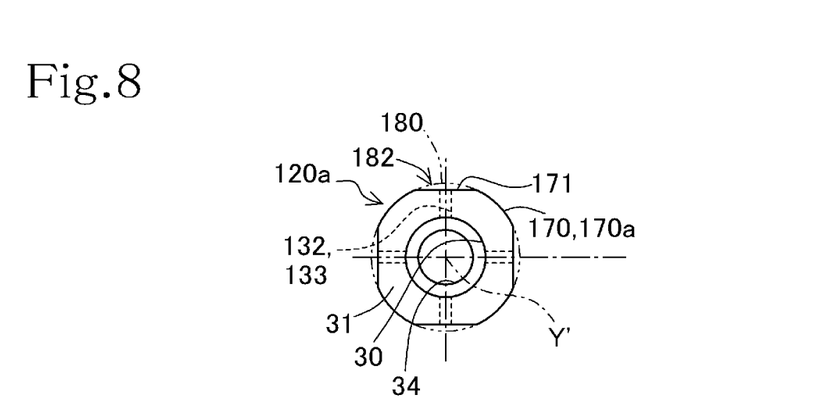
FIG. 8 is an inner side view of a center part of the pressure plate as viewed from a plane taken along a line VIII-VIII in FIG. 7 in an arrow direction.

FIG. 8 is an inner side view of a center part 120a of the pressure plate 120 as viewed from a plane taken along a line VIII-VIII in FIG. 7 in an arrow direction.

As shown in FIG. 6 to FIG. 8, the pressure plate 120 of this second embodiment is formed of: the center part 120a which includes the through hole 30 and the annular rib 34; and an outer peripheral part 120b which has, along a center line Y' of the pressure plate 120, that is, along a clutch axis Y, a fitting hole 180 in which the center part 120a is fitted, and deep hole portions 21 are formed on the outer peripheral part 120b.

Locking ribs 181, which protrude radially inward, are formed on an outer end portion 180a of the fitting hole 180 of the outer peripheral part 120b. The engaging ribs 181 define the position of the center part 120a to be fitted in the fitting hole 180 in an axially outer direction of the clutch device 1, and transmit pressing force generated by the pressing member 43 to the pressure plate 120 with certainty.

As illustrated in FIG. 8, the center part 120a has: a circular cylindrical portion 170 which forms a circular cylindrical surface 170a concentric with the through hole 30 and which is press-fitted in the fitting hole 180 of the outer peripheral part 120b; and notched portions 171 formed by cutting the circular cylindrical surface 170a of the circular cylindrical portion 170 in a planar shape.

Further, radial holes 132, which make the through hole 30 and the notched portions 171 communicate with each other, are formed in the center part 120a. The radial holes 132 form radial passages 133 which function as oil passages.

With such a configuration, in a state where the center part 120a is fitted in the fitting hole 180 of the outer peripheral part 120b, the radial passages 133 which form the oil passages extending in radial directions from the through hole 30 are formed on the side of the inner end portion 30a of the through hole 30, and the inside and the outside of the through hole 30 are made to communicate with each other through spaces 182 formed between the notched portions 171 and the fitting hole 180.

Accordingly, the inside of the through hole 30 and the internal space of the clutch device 1 where deep hole portions 21 are positioned are made to communicate with each other, and hence oil supplied to the through hole 30 can be supplied to the inside of the clutch device 1 through the radial passages 133 by a centrifugal force whereby lubrication property and cooling property of the friction discs 12 and the clutch discs 11 can be enhanced due to the sufficient supply of oil.

The radial holes 132 or the radial passages 133 are not limited to the holes or passages formed in a straight-line shape in a radial direction as shown in FIG. 7 and FIG. 8. The radial holes 132 or the radial passages 133 may respectively have a bent portion or may be inclined with respect to a radial direction.

In the pressure plate 120 of this embodiment, the radial passages 133 are formed by forming the radial holes 132 in the center part 120a which forms a small part, and hence the pressure plate 120 can be easily formed by machine working. Further, the spaces 182 respectively having a large capacity can be formed by the notched portion 171 at the exits of the radial passage 133 in centrifugal force directions. Accordingly, oil can be easily discharged from the through hole 30 in outer peripheral directions through the radial passages 133, and hence oil supplied to the through hole 30 can be easily supplied to the side of the deep hole portion 21.

Further, the pressure plate 120 is a split body formed of the center part 120a and the outer peripheral part 120b, and hence it is possible to increase the degree of freedom in setting the positions of the annular rib 34 and the radial passages 133.

Also in this second embodiment, other configurations can acquire substantially the same manner of operation and the same advantageous effects as the corresponding configurations of the first embodiment.

Although the present invention has been described hereinbefore based on the above-described embodiments, the present invention is not limited to the modes described in the above-described embodiments, and the present invention includes various modes of carrying out the invention within the gist of the present invention.

Further, for the sake of convenience of description, the present invention has been described in accordance with the left and right arrangement described in the first embodiment and the second embodiment. However, it is needless to say that the pressure plate and the clutch device which have the different left and right arrangement are also included within the scope of the present invention.

REFERENCE SINGS LIST

1 . . . clutch device
2 . . . crankshaft
3 . . . transmission
4 . . . main shaft
6 . . . counter shaft
7 . . . clutch outer member
7a . . . peripheral wall portion
10 . . . clutch center member
10a . . . peripheral wall portion
10b . . . pressure receiving portion
11 . . . clutch disc
12 . . . friction disc
13 . . . protruding portion
16 . . . communication hole
20 . . . pressure plate
21 . . . deep hole portion
23 . . . insertion hole
24 . . . clutch spring
25 . . . wall portion
26 . . . notched portion
27 . . . communication portion
30 . . . through hole
30a . . . inner end portion
30b . . . outer end portion
31 . . . opening peripheral end surface
32 . . . radial groove
33 . . . radial passage
34 . . . annular rib
40 . . . hollow hole
41 . . . clutch operating shaft
42 . . . enlarged hole portion
43 . . . pressing member
43a . . . outer end portion
44 . . . fitting hole
45 . . . oil receiving hole
45a . . . oil flow-out hole
46 . . . flange portion
47 . . . bearing
48 . . . washer
60 . . . clutch cover
61 . . . inner surface
62 . . . rib
63 . . . protruding gutter portion
63a . . . distal end
64 . . . oil supply portion
101 . . . clutch device
120 . . . pressure plate
120a . . . center part
120b . . . outer peripheral part
132 . . . radial hole
133 . . . radial passage
170 . . . circular cylindrical portion
170a . . . circular cylindrical surface
171 . . . notched portion
180 . . . fitting hole
180a . . . outer end portion
181 . . . locking rib
182 . . . space
O . . . center portion (of clutch cover)
X . . . crank axis
Y . . . clutch axis, axis (of main shaft)
Y' . . . center axis (of pressure plate)
Z . . . circular cylindrical axis (of deep hole portion)

The invention claimed is:

1. A clutch device comprising:
a clutch outer member for supporting a friction disc in a relatively rotatable manner and in a slidable manner in a direction of a clutch axis of the clutch device; and
a clutch center member for supporting a clutch disc in a relatively non-rotatable manner and in a slidable manner in the direction of the clutch axis,
in which the clutch device includes therein a pressure plate and a clutch spring for axially acting between the pressure plate and the clutch center member to connect the clutch device, the pressure plate having a deep hole portion for accommodating the clutch spring therein,
in which the clutch device includes an axially movable clutch operating shaft extending on the clutch axis and having a pressing member capable of axially pressing and shifting the pressure plate in an axial direction against the clutch spring to disconnect the clutch device, and
in which the clutch device further includes a clutch cover covering the clutch device on an axially outer side of the pressure plate;
wherein:
the pressure plate has a cylindrical through hole in a center thereof, the through hole penetrating the pressure plate to extend between an inside and an outside of the clutch device in a direction of the clutch axis, the through hole being supplied with oil from outside of the clutch device into the through hole;
the pressure plate has a radial passage extending in a radially outward direction from the through hole in an axially inner end portion of the through hole so as to make an inside of the through hole communicate with an outside of the through hole;
the through hole has an annular rib in a form of an annular flange on an inner peripheral surface of an axially outer end portion of the through hole, the annular rib protruding radially inward of the through hole and integrally with the pressure plate, toward a center of the through hole;
the clutch cover has a protruding gutter portion protruding axially inward from the clutch cover into the through hole, to form an oil supply portion;

the pressing member of the clutch operating shaft has, on an axial outer end portion thereof, an axial oil receiving hole opening toward the pressure plate and having an oil flow-out hole; and the protruding gutter portion extends through the annular rib into the axial oil receiving hole.

2. The pressure plate according to claim 1, wherein the radial passage includes: a radial groove provided in a radial direction in an end surface of an axially inner end portion of the through hole; and a washer in contact with the end surface.

3. The pressure plate according to claim 1, wherein:

the pressure plate includes: a center part formed with the through hole and the annular rib; and an outer peripheral part formed around a center line of the pressure plate and having a fitting hole in which the center part is fitted, the deep hole portion being formed on the outer peripheral part;

the center part has a circular cylindrical portion forming a circular cylindrical surface concentric with the through hole and is press-fitted in the fitting hole, and a notched portion formed by cutting the circular cylindrical surface; and the radial passage is formed of a radial hole making the through hole and the notched portion communicate with each other.

4. A clutch device comprising the pressure plate according to claim 1, wherein an oil supply portion for supplying oil into the pressure plate is provided so as to be disposed at an axially inner end portion of the through hole, more axially inside of the annular rib in the through hole.

5. The clutch device according to claim 4, wherein:

the pressing member presses the pressure plate by way of a washer and a bearing and is disposed on an axial end surface of the axially inner end portion of the through hole; and the axial outer end portion of the pressing member is positioned on a more axially inner side of the through hole than the annular rib in a direction of the clutch axis, and the annular rib has an inner diameter smaller than an outer diameter of the axial outer end portion of the pressing member.

6. A clutch device comprising the pressure plate according to claim 2, wherein an oil supply portion for supplying oil into the pressure plate is provided so as to be disposed at an axially inner end portion of the through hole, more axially inside of the annular rib in the through hole.

7. A clutch device comprising the pressure plate according to claim 3, wherein an oil supply portion for supplying oil into the pressure plate is provided so as to be disposed at an axially inner end portion of the through hole, more axially inside of the annular rib in the through hole.

8. The clutch device according to claim 6, wherein:

the pressing member presses the pressure plate by way of a washer and a bearing and is disposed on an axial end surface of the axially inner end portion of the through hole; and the axial outer end portion of the pressing member is positioned on a more axially inner side of the through hole than the annular rib in a direction of the clutch axis, and the annular rib has an inner diameter smaller than an outer diameter of the axial outer end portion of the pressing member.

9. The clutch device according to claim 7, wherein:

the pressing member presses the pressure plate by way of a washer and a bearing and is disposed on an axial end surface of the axially inner end portion of the through hole; and the axial outer end portion of the pressing member is positioned on a more axially inner side of the through hole than the annular rib in a direction of the clutch axis, and the annular rib has an inner diameter smaller than an outer diameter of the axial outer end portion of the pressing member.

10. A clutch device comprising:

a clutch outer member for supporting a friction disc in a relatively rotatable manner and in a slidable manner in a direction of a clutch axis of the clutch device;

a clutch center member for supporting a clutch disc in a relatively non-rotatable manner and in a slidable manner in the direction of the clutch axis, and a pressure plate and a clutch spring for axially acting between the pressure plate and the clutch center member to connect the clutch device, the pressure plate having a deep hole portion for accommodating the clutch spring therein, wherein the pressure plate includes: a center part formed with the through hole and the annular rib; and an outer peripheral part formed around a center line of the pressure plate and having a fitting hole in which the center part is fitted, the deep hole portion being formed on the outer peripheral part;

the center part has a circular cylindrical portion forming a circular cylindrical surface concentric with the through hole and is press-fitted in the fitting hole, and a notched portion formed by cutting the circular cylindrical surface; and the radial passage is formed of a radial hole making the through hole and the notched portion communicate with each other.

* * * * *